(12) United States Patent
Alvarez

(10) Patent No.: US 6,463,543 B1
(45) Date of Patent: Oct. 8, 2002

(54) SERIAL BUS COMMUNICATIONS SYSTEM

(75) Inventor: Jose A. Alvarez, Elizabeth, NJ (US)

(73) Assignee: Btech, Inc., Morris Plains, NJ (US)

( * ) Notice: Subject to any disclaimer, the term of this patent is extended or adjusted under 35 U.S.C. 154(b) by 0 days.

(21) Appl. No.: 09/366,001

(22) Filed: Aug. 3, 1999

(51) Int. Cl.[7] ............................. G06F 1/26; H04M 1/38
(52) U.S. Cl. ..................... 713/323; 713/320; 455/574
(58) Field of Search ................... 713/320, 323; 455/13.4, 500, 507, 522, 88, 78, 572, 574, 575, 92, 270, 343

(56) References Cited

U.S. PATENT DOCUMENTS

| | | | |
|---|---|---|---|
| 3,578,990 A | * 5/1971 | Naubereit | 307/293 |
| 4,367,414 A | * 1/1983 | Miller et al. | 307/38 |
| 4,449,248 A | 5/1984 | Leslie et al. | 455/38 |
| 4,451,826 A | 5/1984 | Fasching | 340/825.07 |
| 4,689,619 A | 8/1987 | O'Brien, Jr. | 340/825.08 |
| 4,692,919 A | 9/1987 | West, Jr. | 370/96 |
| 4,791,547 A | 12/1988 | Petroff | 364/138 |
| 4,974,199 A | * 11/1990 | Verbanets, Jr. et al. | 364/900 |
| 5,095,308 A | 3/1992 | Hewitt | 340/825.44 |
| 5,166,675 A | 11/1992 | Amemiya et al. | 340/825.08 |
| 5,345,564 A | 9/1994 | Jensen et al. | 395/275 |
| 5,440,560 A | 8/1995 | Rypinski | 370/95.2 |
| 5,627,882 A | * 5/1997 | Chien et al. | 379/61 |
| 5,790,946 A | * 8/1998 | Rotzoll | 455/343 |
| 6,144,312 A | * 11/2000 | Will | 340/825.31 |

FOREIGN PATENT DOCUMENTS

| | | |
|---|---|---|
| DE | 19606940 | 4/1997 |
| GB | 2262634 | 6/1993 |
| WO | 9406215 | 3/1994 |

OTHER PUBLICATIONS

Structured Computer Organization 3rd edition by Andrew S. Tanenbaum 1976.*

* cited by examiner

Primary Examiner—Peter Wong
Assistant Examiner—Tim Vo
(74) Attorney, Agent, or Firm—Selitto, Behr & Kim

(57) ABSTRACT

An electronic system having a central controller coupled to a plurality of remote transceiver modules by means of a serial bus. The modules are designed to remain in a sleep mode in which they consume no power until such time as a wakeup signal is sent over the bus by the central controller. Each module includes a source of power and power supply circuitry adapted to provide power for operating the module when the power supply circuitry is connected to the source of power. Each module further includes an energy detector coupled to the bus and adapted to connect the power supply circuitry to the source of power upon detection of energy, in the form of the wakeup signal, on the bus. Within each module is a microprocessor which responds to the provision of power by maintaining the connection between the source of power and the power supply after the wakeup signal has terminated and until such time as the module completes its assigned task.

15 Claims, 5 Drawing Sheets

SERIAL BUS COMMUNICATIONS SYSTEM

BACKGROUND OF THE INVENTION

This invention relates to a communications system including a central controller coupled to a plurality of remote transceiver modules by a serial bus and, more particularly, to such a system where the modules remain in a sleep mode without consuming any power until such time as the central controller provides a wakeup signal over the bus.

Systems are known which include a central controller and a plurality of remote transceiver modules communicating with the central controller over a bus. It is common in such a system that the remote transceiver modules are normally in a low power consuming standby mode and at regular intervals "wake up" to look for an interrogation signal placed on the bus by the central controller. If no such interrogation signal is recognized, the module returns to its standby mode. However, even while it is in a standby mode, the module consumes power. There are applications where such power consumption is undesirable. For example, in a system where the modules are utilized to monitor battery systems and each module receives its operating power from the batteries which it is monitoring, the aforedescribed approach results in unacceptable battery drain. Accordingly, it would be desirable to have a system of the type described wherein the remote modules do not consume any power whatsoever while in the standby mode.

SUMMARY OF THE INVENTION

According to the present invention, there is provided an electronic system having a central controller, at least one remote transceiver module, and a serial bus interconnecting the central controller and all of the remote transceiver modules. Each module includes a source of power and power supply circuitry adapted to provide power for operating the module when the power supply circuitry is connected to the source of power. The central controller is adapted to transmit energy along the bus as a signal to all of the modules to change state to an active mode from a sleep mode in which each module consumes no power. Each module further includes an energy detector coupled to the bus and adapted to connect the power supply circuitry to the source of power upon detection of energy on the bus.

In accordance with an aspect of this invention, the bus is a continuous twisted pair of wires coupled together at an end remote from the central controller. Each module includes a transformer having a ferrite core extending through the twisted pair of wires so that the primary winding of the transformer is a single turn of the bus wires, with the transformer further having a secondary winding coupled to the energy detector.

In accordance with another aspect of this invention, the power supply circuitry includes a transformer to provide galvanic separation between the source of power and the power provided by the power supply circuit.

Further according to this invention, each module includes a winding inductively coupled to the bus for selectively effecting communication between the module and the central controller, and each module is arranged to short its winding when that module is not communicating with the central controller. Accordingly, the bus is minimally loaded by those modules not communicating with the central controller.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
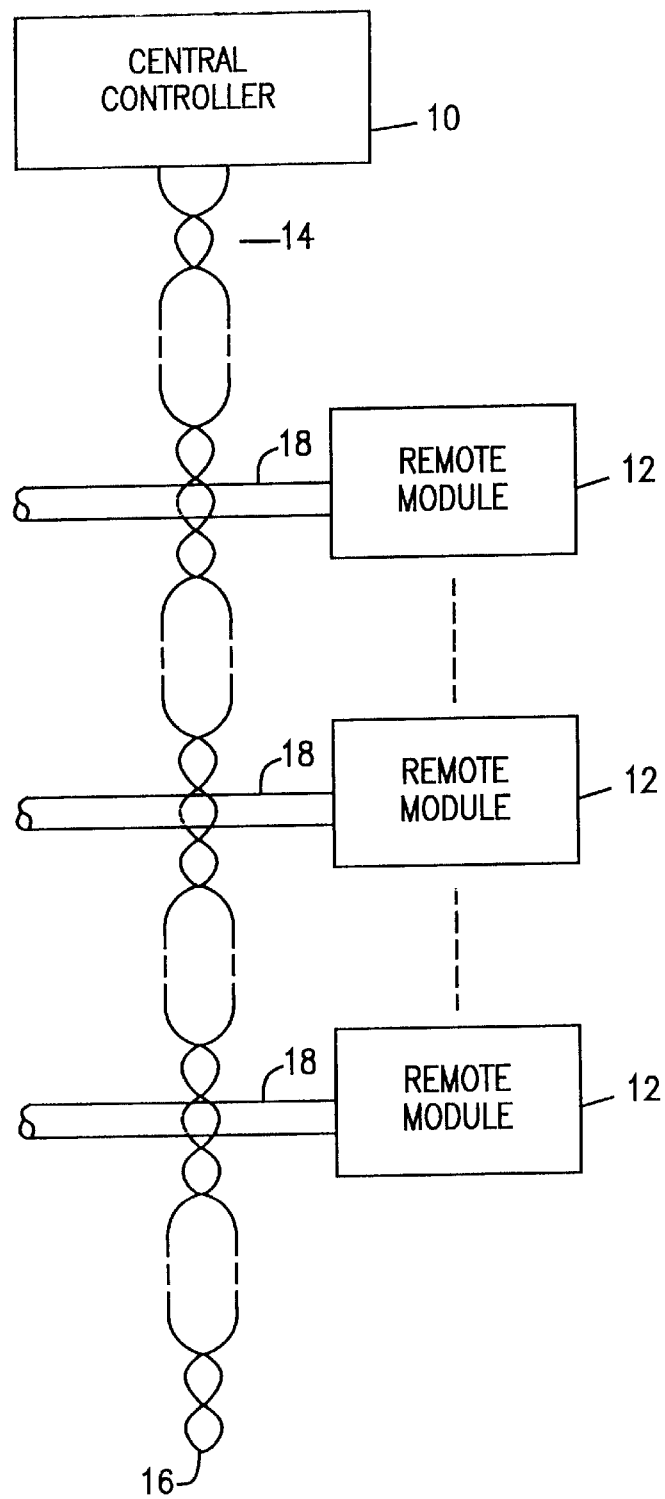
FIG. 1 is an overall block diagram showing a system constructed in accordance with the principles of this invention.

Referring now to the drawings, FIG. 1 shows a system constructed in accordance with the principles of this invention. As shown, the inventive system includes a central controller 10 and a plurality of remote transceiver modules 12. A serial bus 14 is used to couple the central controller 10 with the modules 12. Illustratively, the bus 14 is a continuous twisted pair of wires coupled together at an end 16 which is remote from the central controller 10. As shown, the twisted pair of wires are merely shorted together at the end 16, but in some applications the bus 14 would be terminated at the end 16 in its characteristic impedance. To couple each of the modules 12 to the bus 14, each of the modules 12 is provided with a respective ferrite core 18 which is split and preferably of a self-shielding "square" or "pot" configuration. To couple each ferrite core 18 to the bus 14, at the location of each module 12 the twisted pair of wires of the bus 14 is spread apart and slid over the center pole of the associated ferrite core 18 to provide a single turn primary of a transformer. Accordingly, signals placed on the bus 14 by the central controller 10 are sensed by all of the modules 12. Windings on the core 18 within the module 12 are used both to pick off signals placed on the bus 14 by the central controller 10 or to place signals on the bus 14 for transmission to the central controller 10, as will be described.

According to the present invention, each of the modules 12 is arranged to remain in a sleep mode in which it consumes no power whatsoever until such time as a "wakeup" signal is received over the bus 14 from the central controller 10. Each module 12 then changes state into an active mode during which it receives data signals placed on the bus 14 by the central controller 10 and places data signals on the bus 14 for receipt by the central controller 10. When all such activity is terminated, each module 12 returns to its sleep mode until such time as the central controller 10 again places a wakeup signal on the bus 14. Thus, power is consumed by each module 12 only during the time it is in the active mode.

Figure 2:
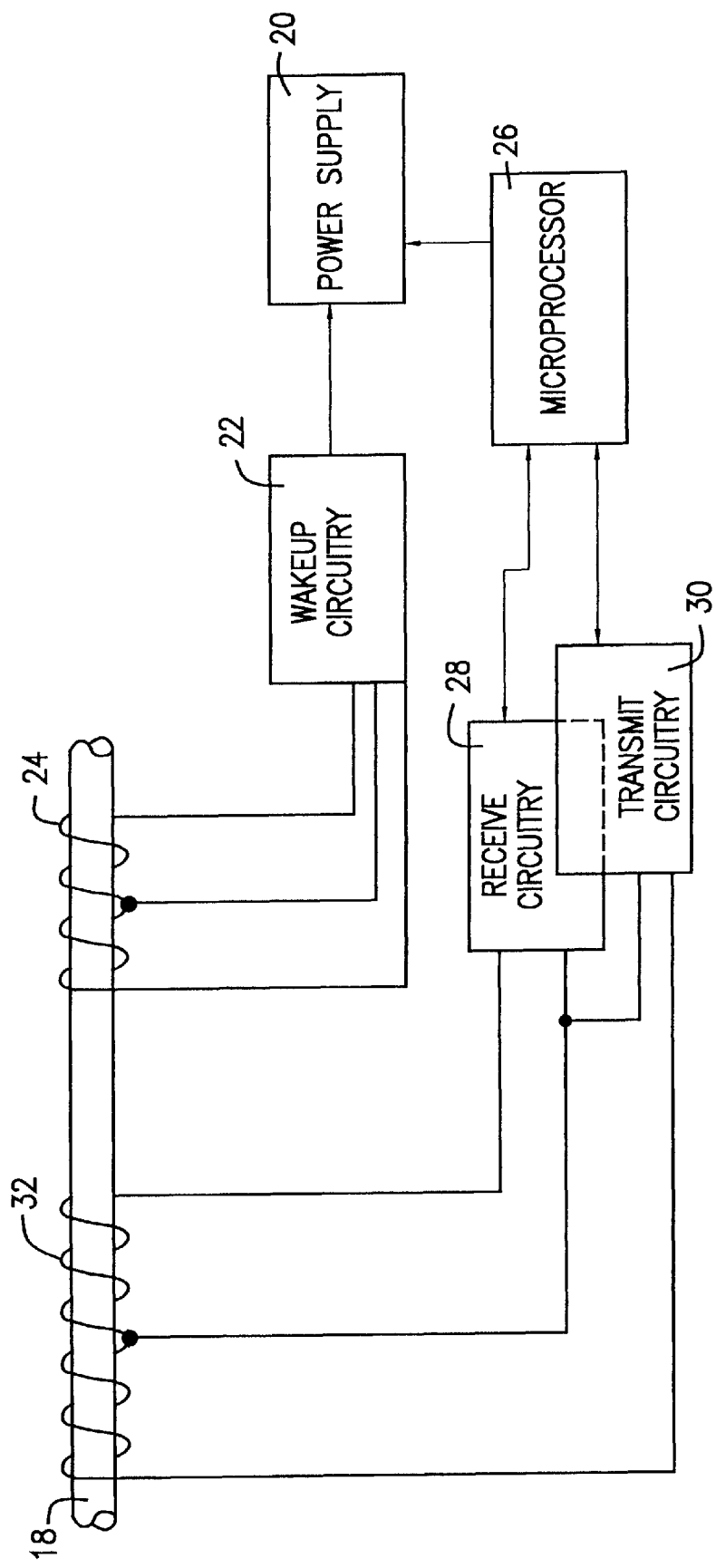
FIG. 2 is a block diagram showing a remote transceiver module for the system shown in FIG. 1.

FIG. 2 is a block diagram showing a module 12, constructed according to the present invention. The module 12 includes power supply circuitry 20 which provides power for operating the module 12 when the power supply circuitry 20 is connected to a source of power (not shown in FIG. 2). The wakeup circuitry 22 is connected to a winding 24 which is wound on the ferrite core 18 and operates to sense energy applied to the bus 14 by the central controller, in the form of the wakeup signal, to cause the power supply circuitry 20 to be connected to the source of power. When the power supply circuitry 20 is connected to the source of power, it provides power to the microprocessor 26, which acts as the controller for the module 12, and to the receive circuitry 28 and the transmit circuitry 30.

As illustrated by the broken lines, the receive circuitry 28 and the transmit circuitry 30 share some common circuitry, as will be described. Upon the provision of power to the microprocessor 26, the module 12 changes state from its sleep mode to its active mode. The receive circuitry 28 and the transmit circuitry 30 are connected to the winding 32 wound on the ferrite core 18 so that the receive circuitry 28 can receive signals placed on the bus 14 by the central controller 10 and the transmit circuitry 30 can place signals on the bus 14 for receipt by the central controller 10. The microprocessor 26 is adapted to respond to instructions placed on the bus 14 by the central controller 10, in the form of data signals processed by the receive circuitry 28 and passed along to the microprocessor 26, to perform a task, which may include monitoring some peripheral equipment, and then transmit information back to the central controller 10 over the bus 14 by means of the transmit circuitry 30. At the end of each such task, the microprocessor 26 is arranged to disconnect the power supply circuitry 20 from the source of power, thereby returning the module 12 to its sleep mode.

Figure 3:
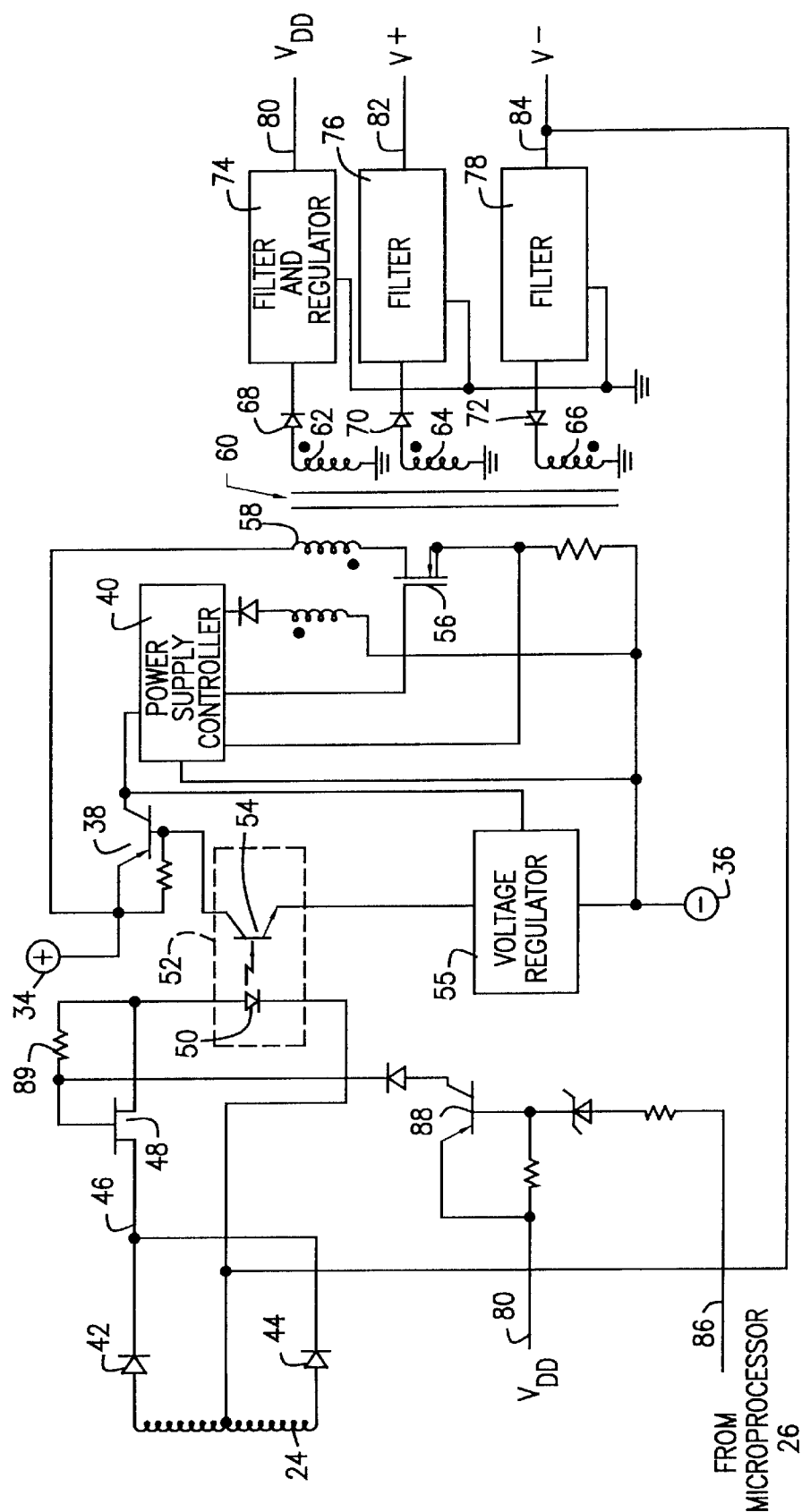
FIG. 3 is a schematic diagram showing the wakeup circuitry and the power supply circuitry of the module shown in FIG. 2.

FIG. 3 illustrates circuitry implementing the wakeup circuitry 22 and the power supply circuitry 20. It will be recalled that when the module 12 is in its sleep mode, the power supply circuitry 20 is not connected to the source of power. As shown in FIG. 3, the source of power is illustratively a battery having a positive terminal 34 and a negative terminal 36. In an application where the modules 12 are used to monitor battery systems, the terminals 34, 36 can be terminals of the batteries being monitored. In any event, the transistor 38 operates as a normally open switch coupled in series between the battery terminal 34 and the power supply controller 40. As will be described, upon receipt of a wakeup signal on the bus 14 from the central controller 10, the transistor 38 becomes conductive.

Illustratively, the wakeup signal provided on the bus 14 by the central controller 10 is a twenty kilohertz current square-wave having a duration of approximately one second. This signal is transformed by the winding 24, which illustratively is a two hundred turn center tapped winding, and converted by the diodes 42, 44 into a substantially constant current on the lead 46 to the P-channel JFET device 48, which acts as a normally closed switch. The current then passes through the light emitting diode 50 in the optocoupler 52. Light emitted by the diode 50 is received at the base of the phototransistor 54, which becomes conductive and causes the transistor 38 to likewise conduct. With the transistor 38 conducting, the power source is connected to the power supply controller 40. The voltage regulator 55 senses the voltage across the power supply controller 40 and limits the current through the phototransistor 54 and the transistor 38 to maintain a constant voltage across the power supply controller 40. The power supply controller 40 controls the N-channel MOSFET device 56 to charge the primary winding 58 of the transformer 60 with current. The secondary windings 62, 64, 66 of the transformer 60 are connected through the diodes 68, 70, 72, respectively, to filter and regulator 74, filter 76 and filter 78, respectively, to provide voltages on the leads 80, 82, 84, respectively, for powering the module 12. The use of the transformer 60 maintains a galvanic separation between the power source terminals 34, 36 and the power supply output on the leads 80, 82, 84.

When the microprocessor 26 receives power from the power supply circuitry 20, it turns on and goes into its active mode. At such time, it places a low signal on the lead 86, which causes the transistor 88 to become conductive. Thus, the transistor 88 functions as a normally open switch, and when it "closes" by becoming conductive, it provides a path for current to flow from the power supply output $V_{DD}$ (lead 80) through the light emitting diode 50. At the same time, this causes the device 48 to become non-conductive. As long as the power supply circuitry 20 is providing power to the module 12, the transistor 88 remains conductive to allow current to flow through the light emitting diode 50 through the resistor 89. This maintains the conductivity of the phototransistor 54, which keeps the transistor 38 conductive and connects the source of power to the power supply circuitry. In effect, the wakeup circuitry 22 functions as a latching relay. When the microprocessor 26 determines that the task of the module 12 is completed, it removes the low signal from the lead 86. Accordingly, the transistor 88 turns off and stops the flow of current through the light emitting diode 50. In the absence of current through the light emitting diode 50, the transistor 54 becomes non-conductive, opening the path provided by the transistor 38, and disconnecting the power supply circuitry 20 from the power source terminals 34, 36. Without power on the leads 80, 82, 84, the module 12 reverts to its sleep mode.

Figure 4:
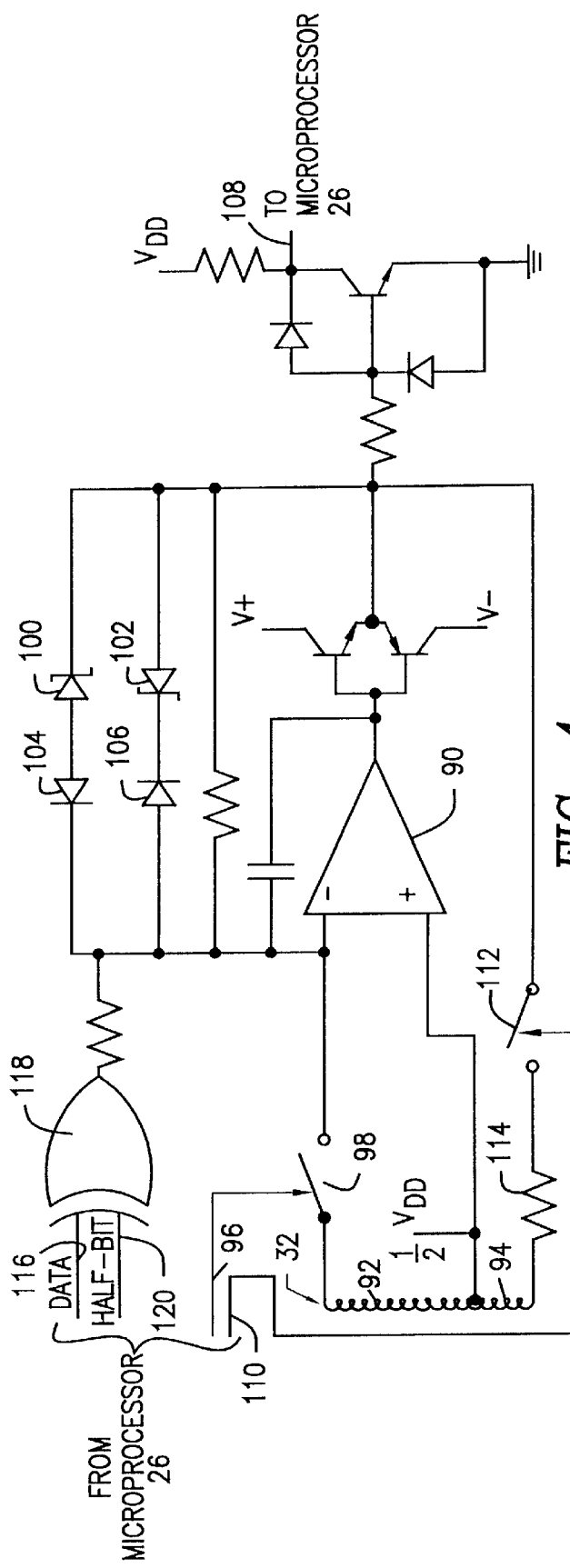
FIG. 4 is a schematic diagram showing the receive and transmit circuitry of the module shown in FIG. 2.

FIG. 4 shows the receive circuitry 28 and the transmit circuitry 30. The receive and transmit circuitry 28, 30 share the amplifier 90, since they are not both active at the same time. For communication over the bus 14 with the central controller 10, the winding 32 on the ferrite core 18 is divided into two parts. The first part 92 of the winding 32 is used for receiving signals transmitted by the central controller 10 and illustratively has one hundred turns, while the second part 94 of the winding 32 is used for transmitting signals to the central controller 10 and illustratively has forty turns. When the module 12 is in the receive mode, the microprocessor 26 places an appropriate signal on the lead 96 to close the switch 98 and connect the first part 92 of the winding 32 to the amplifier 90. In the feedback loop of the amplifier 90, the Zener diodes 100, 102 provide a clamping function because the current on the bus 14 varies depending on its length. The diodes 104, 106 speed up the switching of the amplifier 90. The output of the amplifier 90 is provided to the microprocessor 26 over the lead 108. At the end of the receive mode, the microprocessor 26 removes the signal from the lead 96 to open the switch 98.

Figure 5:
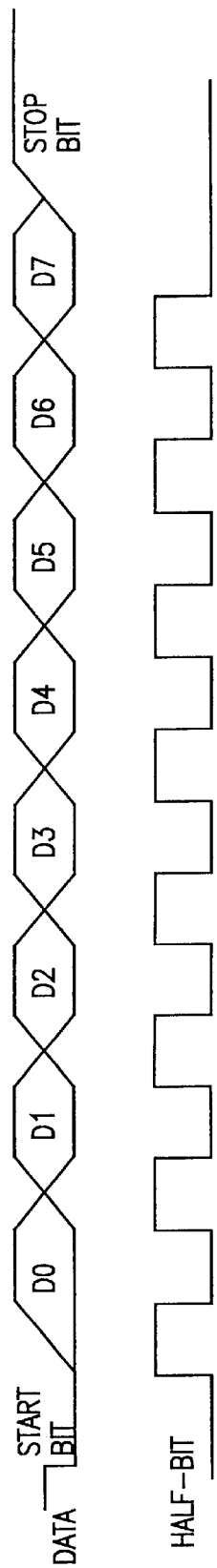
FIG. 5 shows illustrative signal waveforms used in the system of FIG. 1.

When the module 12 is in the transmit mode, the microprocessor 26 provides an appropriate signal on the lead 110 to close the switch 112 and connect the output of the amplifier 90 to the second part 94 of the winding 32, through the resistor 114, which limits the current through the winding part 94 when the switch 112 is closed but the transmitter is idle. When the module 12 is transmitting, the microprocessor 26 provides data signals on the input lead 116 to the exclusive OR gate 118 and provides half-bit signals on the input lead 120 to the exclusive OR gate 118. The formats of the data and half-bit signals are shown in FIG. 5. As shown, the data stream is a start bit followed by eight data bits followed by a stop bit. The half-bit signal is a pulse train having two transitions for each data bit to insure that the duty cycle of the resulting bit stream on the bus 14 is always 50%.

Figure 6:
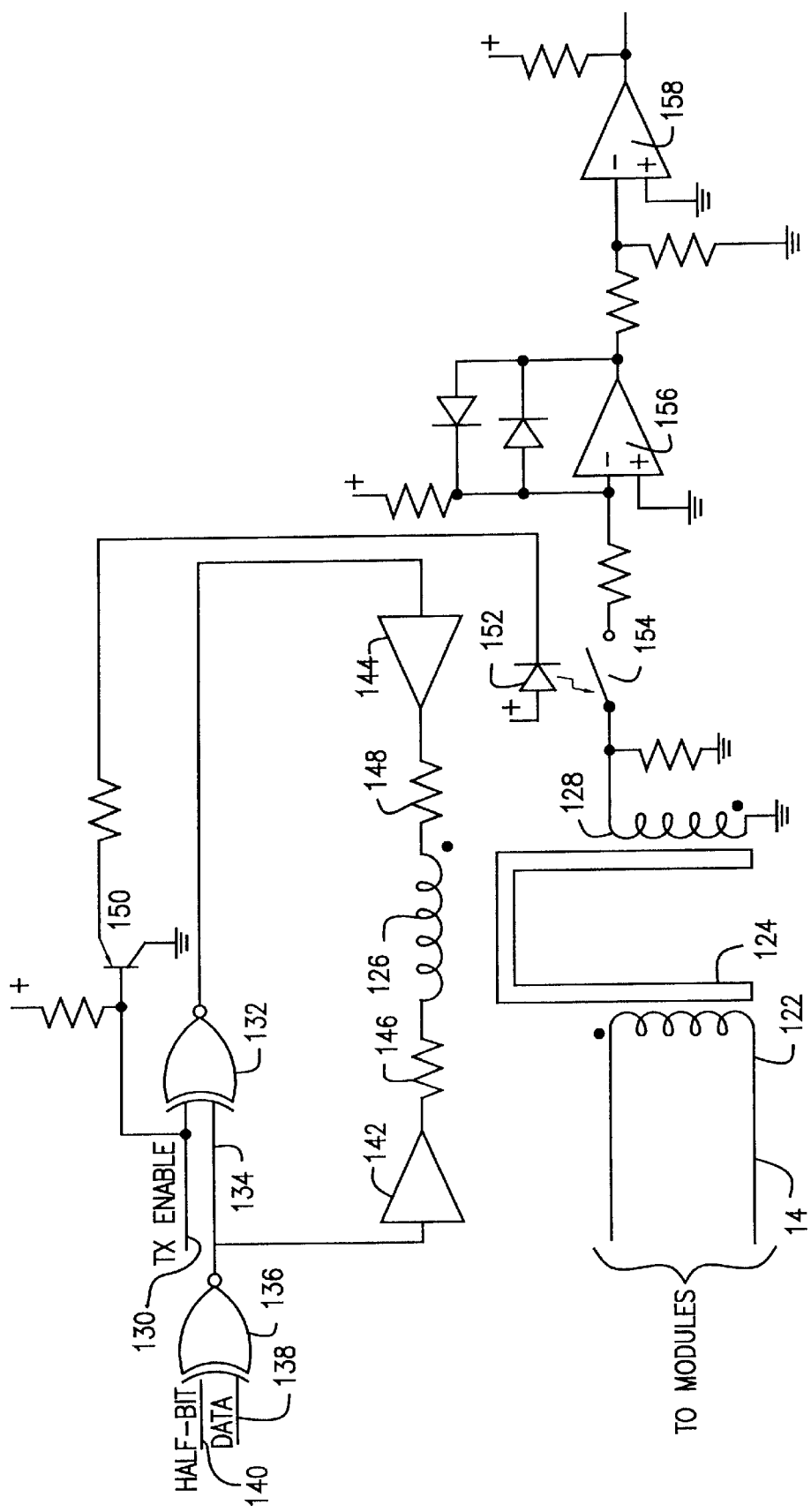
FIG. 6 is a schematic diagram showing a portion of the central controller illustrating how the central controller is coupled to the bus.

FIG. 6 shows a portion of the central controller 10 and how it is coupled to the bus 14. As shown, the bus 14 is terminated by a winding 122 on a core 124. The central controller 10 includes a transmit winding 126 on the core 124 and a receive winding 128 on the core 124. Illustratively, the windings 122, 126, 128 all have forty turns. When transmitting on the bus 14, the central controller 10 places a transmit enable signal on the lead 130, which is one input of the exclusive NOR gate 132. The other input to the exclusive NOR gate 132 is over the lead 134 from the output of the exclusive NOR gate 136. The inputs to the exclusive NOR gate 136 are data signals on the lead 138 and a half-bit pulse train on the lead 140. The function of the half-bit pulse train has been discussed above. The output of the exclusive NOR gate 136 is provided as an input to the current amplifier 142 and the output of the exclusive NOR gate 132 is provided as an input to the current amplifier 144. The amplifiers 142, 144 provide complementary signals on their outputs through the resistors 146 and 148, respectively, to the transmit winding 126.

With the transmit enable signal present on the lead 130, the transistor 150 is non-conductive, so that no current flows through the light emitting diode 152. When the transmit enable signal is taken away from the lead 130, the transistor 150 conducts, allowing the light emitting diode 152 to conduct and emit light, thereby closing the photosensitive switch 154. The central controller 10 can then receive signals placed on the bus 14 by one of the modules 12, via the receive winding 128 and the amplifiers 156 and 158.

When the wakeup signal is transmitted over the bus 14 by the central controller 10, all of the modules 12 change state to the active mode. However, the central controller 10 only communicates with one of the modules 12 at any given time. It does this by transmitting a signal over the bus 14 identifying a particular module with which it wishes to communicate. The other modules remain in their active state but are off-line. These off-line modules do not load the bus 14 because their secondaries are shorted by the switch 98.

Accordingly, there has been disclosed a communications system including a central controller coupled to a plurality of remote transceiver modules by a serial bus wherein the modules remain in a sleep mode without consuming any power until such time as the central controller provides a wakeup signal over the bus. While an illustrative embodiment of the present invention has been disclosed herein, it is understood that various adaptations and modifications to the disclosed embodiment are possible, and it is intended that this invention be limited only by the scope of the appended claims.

What is claimed is:

1. A transceiver module adapted to be coupled to a central controller by a serial bus, the module adapted to be either in a sleep mode in which it does not consume any power or in an active mode in which it receives data signals placed on the bus by the central controller and places data signals on the bus for receipt by the central controller, the central controller adapted to place on the bus a predetermined pulse train as a wakeup signal to the module to change state from the sleep mode to the active mode, the module comprising:
    a source of power;
    power supply circuitry adapted to provide power for operating the module when the power supply circuitry is connected to the source of power;
    a controllable normally open first switch coupled between the source of power and the power supply circuitry and adapted to selectively provide a circuit connection between the source of power and the power supply circuitry;
    a light emitting device coupled to the bus and responsive to the predetermined pulse train to emit light; and
    a light responsive element positioned to receive light emitted by the light emitting device and coupled to the first switch so as to cause the first switch to close and provide the circuit connection in response to receiving light from the light emitting device.

2. The module according to claim 1 further comprising:
    a module controller coupled to receive power from the power supply circuitry;
    a controllable normally closed second switch coupled between the bus and the light emitting device and adapted to selectively provide a circuit connection between the bus and the light emitting device; and
    a controllable normally open third switch coupled between the power supply circuitry and the light emitting device and adapted to selectively provide a circuit connection between the power supply circuitry and the light emitting device;
    wherein the module controller is arranged to respond to the receipt of power from the power supply circuitry to cause the second switch to open and the third switch to close.

3. The module according to claim 1 wherein the bus is a continuous twisted pair of wires coupled together at an end remote from the central controller and the module further comprises:
    a transformer having a ferrite core extending through the twisted pair of wires so that the primary winding of the transformer is a single turn of the bus wires, the transformer further having a secondary winding coupled to the light emitting device.

4. The module according to claim 1 wherein the power supply circuitry includes a transformer to provide galvanic separation between the source of power and the power provided by the power supply circuitry.

5. The module according to claim 3 further comprising:
    a further secondary winding on said ferrite core, said further secondary winding having a first part and a second part with a common tap therebetween;
    an amplifier having an output, an inverting input and a non-inverting input;
    a reference voltage source coupled to the common tap of the further secondary winding and to the amplifier non-inverting input;
    a controllable receive switch coupled between the transformer further secondary winding first part and the amplifier inverting input; and
    a controllable transmit switch coupled between the transformer further secondary winding second part and the amplifier output;
    wherein the module controller is adapted to selectively control the states of the receive switch and the transmit switch; and
    wherein the module controller is coupled to provide data signals to the amplifier inverting input for transmission over the bus to the central controller when the transmit switch is closed and the receive switch is open, and to receive data signals from the amplifier output when the receive switch is closed and the transmit switch is open.

6. The module according to claim 5 further comprising:
    an exclusive OR gate having two inputs and an output coupled to the amplifier inverting input;
    wherein the module controller provides data signals to one of the gate inputs and provides a half-bit pulse train to the other gate input;
    whereby the duty cycle of signals on the bus is maintained at fifty percent.

7. An electronic system comprising:
a central controller;
a serial bus coupled at a first end to the central controller; and
at least one remote transceiver module coupled to the bus;
wherein each transceiver module is adapted to be either in a sleep mode in which it does not consume any power or in an active mode in which it receives data signals placed on the bus by the central controller and places data signals on the bus for receipt by the central controller, wherein the central controller is adapted to place on the bus a predetermined pulse train as a wakeup signal to the modules to change state from the sleep mode to the active mode, and wherein each module comprises:
a source of power;
power supply circuitry adapted to provide power for operating the module when the power supply circuitry is connected to the source of power;
a controllable normally open first switch coupled between the source of power and the power supply circuitry and adapted to selectively provide a circuit connection between the source of power and the power supply circuitry;
a light emitting device coupled to the bus and responsive to the predetermined pulse train to emit light; and
a light responsive element positioned to receive light emitted by the light emitting device and coupled to the first switch so as to cause the first switch to close and provide the circuit connection in response to receiving light from the light emitting device.

8. The system according to claim 7 wherein each module further comprises:
a module controller coupled to receive power from the power supply circuitry;
a controllable normally closed second switch coupled between the bus and the light emitting device and adapted to selectively provide a circuit connection between the bus and the light emitting device; and
a controllable normally open third switch coupled between the power supply circuitry and the light emitting device and adapted to selectively provide a circuit connection between the power supply circuitry and the light emitting device;
wherein the module controller is arranged to respond to the receipt of power from the power supply circuitry to cause the second switch to open and the third switch to close.

9. The system according to claim 7 wherein the bus is a continuous twisted pair of wires coupled together at an end remote from the central controller and each module further comprises:
a transformer having a ferrite core extending through the twisted pair of wires so that the primary winding of the transformer is a single turn of the bus wires, the transformer further having a secondary winding coupled to the light emitting device.

10. The system according to claim 7 wherein each module further comprises:
a further secondary winding on said ferrite core, said further secondary winding having a first part and a second part with a common tap therebetween;
an amplifier having an output, an inverting input and a non-inverting input;
a reference voltage source coupled to the common tap of the further secondary winding and to the amplifier non-inverting input;
a controllable receive switch coupled between the transformer further secondary winding first part and the amplifier inverting input; and
a controllable transmit switch coupled between the transformer further secondary winding second part and the amplifier output;
wherein the module controller is adapted to selectively control the states of the receive switch and the transmit switch; and
wherein the module controller is coupled to provide data signals to the amplifier inverting input for transmission over the bus to the central controller when the transmit switch is closed and the receive switch is open, and to receive data signals from the amplifier output when the receive switch is closed and the transmit switch is open.

11. The system according to claim 7 wherein the power supply circuitry in each module includes a transformer to provide galvanic separation between the source of power and the power provided by the power supply circuitry.

12. The system according to claim 7 wherein the central controller comprises:
a transformer including a bus winding connected to the serial bus, a transmit winding and a receive winding;
a receive amplifier having an input and an output;
a controllable normally open third switch coupled between the receive winding and the receive amplifier input;
a pair of transmit amplifiers each having an input and an output, with each transmit amplifier output being coupled to a respective end of the transmit winding;
a first exclusive NOR gate having a pair of inputs coupled to receive data signals and a half-bit pulse train, respectively, and an output coupled to the input of a first of the pair of transmit amplifiers;
a second exclusive NOR gate having a pair of inputs coupled to receive a transmitter enable signal and to the first exclusive NOR gate output, respectively, and an output coupled to the input of the other transmit amplifier; and
a switch controller coupled to receive the transmitter enable signal and adapted to cause closure of the third switch in the absence of the transmitter enable signal.

13. The system according to claim 10 wherein each module further comprises:
an exclusive OR gate having two inputs and an output coupled to the amplifier inverting input;
wherein the module controller provides data signals to one of the gate inputs and provides a half-bit pulse train to the other gate input;
whereby the duty cycle of signals on the bus is maintained at fifty percent.

14. An electronic system having a central controller, at least one remote transceiver module, and a serial bus interconnecting the central controller and all of the at least one remote transceiver module;
wherein each module includes a source of power and power supply circuitry adapted to provide power for operating the module when the power supply circuitry is connected to the source of power;
wherein the central controller is adapted to transmit energy along the bus as a signal to all of the at least one module to change state to an active mode from a sleep mode in which each module consumes no power; and wherein each module further includes an energy detector coupled to the bus and adapted to connect the power supply circuitry to the source of power upon detection of energy on the bus.

15. A communications system having a central controller, at least one remote transceiver module, and a serial bus interconnecting the central controller and all of the at least one remote transceiver module;

wherein each module includes a winding inductively coupled to the bus for selectively effecting communication between the central controller and said each module; and wherein each module is arranged to short its winding when said each module is not communicating with the central controller;

whereby the bus is minimally loaded by modules not communicating with the central controller.

* * * * *